Patented Apr. 12, 1949

2,467,339

UNITED STATES PATENT OFFICE 2,467,339

VINYL AROMATIC COMPOSITIONS CONTAINING COLLOIDAL SILICA

Raymond B. Seymour, Dayton, Ohio, assignor to Monsanto Chemical Company, St. Louis, Mo., a corporation of Delaware No Drawing. Application November 17, 1944,
Serial No. 563,991

2 Claims. (Cl. 260—41)

The present invention relates to improved polyvinyl aromatic hydrocarbon resins and more particularly to polyvinyl aromatic resins containing silica in colloidal form and to a process for producing the same. This invention also provides liquid or resinous vinyl aromatic organosols containing colloidal silica.

The use of non-colloidal silica as a filler for vinyl resins is well known. For example, in the Stose Patent No. 2,116,986 diatomaceous earth, which is practically pure silica, is employed as a filler in the manufacture of phonograph records from vinyl resins. Crushed quartz has been suggested for use as a filler in the preparation of molded electrical insulating agents from polystyrene in the Berberich Patent No. 2,333,513. Silica gel has been suggested for the same purpose for use with polymerized ethyl acrylate in the Nowak and Hofmeier Patent No. 2,209,928. In such previous applications the siliceous material was merely employed in mechanical admixture with the vinyl resin, the resin serving as a bonding material for the silica particles. That no permanent combination between the silica and the resin was formed may be shown, for example, by the fact that the siliceous filler and the vinyl compound could be separated from each other by adding the filled, molded resin to a material which was a solvent for the resin, whereupon the resin dissolved to give a solution of the resin in presence of undissolved silica particles. There was no permanent combination or dispersion of the silica particles in the vinyl resin, because the silica and the resin could be separated from each other by leaching the silica filled resin with a solvent. It is possible thereby to separate the silica from the resin and to recover both components in unchanged form by removal of the solvent.

The combinations herein disclosed, on the other hand, are not separable by leaching with a solvent. As a matter of fact, as will be pointed out below, dispersions of colloidal silica in polystyrene can be obtained which are totally insoluble in the usual solvents for polystyrene. However, in those combinations of polystyrene and silica where the silica is present in quantity less than that which will produce insolubility, no separation of silica and polystyrene takes place when the resins are dissolved in suitable solvents. Indeed, the solvent may be evaporated and the silica containing resin recovered in the same form in which it existed prior to solution.

Accordingly, previously known mechanical admixtures of vinyl resins and non-colloidal siliceous materials could not be employed to obtain homogeneous, smooth, cast films; for in casting the mixtures from solutions the silica separated out to give heterogeneous, brittle films that were characterized by a rough surface and a lack of clarity. Molded pieces prepared from mechanical admixtures of a vinyl resin and silica likewise lacked homogeneity. Hence, in spite of the known favorable heat-resisting and electrical insulating properties of silica, the prior art did not know how to incorporate it into a resinous material without incurring thereby a loss of clarity, flexibility and smoothness in the resulting products.

In the prior art products there was no true combination of the ingredients, each member of the aggregation retaining its own properties. In the case of the present products, the silica, being colloidally or molecularly associated with the molecules of the resin, has not lost its colloidal character, and hence imparts valuable properties to the vinyl aromatic resin itself, as will be pointed out in detail below.

I have found that when I combine a vinyl aromatic compound either in the monomeric or polymeric form with a siliceous material which is in sol form, I am able to prepare a silica-containing liquid organosol or resinous sol which may be cast or polymerized into flexible, transparent, homogeneous films or molded under heat and pressure to yield substantially clear, transparent molded pieces of good mechanical properties and very high resistance to heat and solvents. I may use an aquasol or an alcohol sol of silica, for example, the sols disclosed in the Marshall Patents No. 2,285,449, No. 2,356,773 and No. 2,356,774, particularly a silica sol in a monohydric lower aliphatic alcohol, i. e., an alcohol of from 1 to 5 carbon atoms. There may also be employed the silica sols made by the method disclosed in U. S. Patent No. 2,244,325 and in the Neudlinger Patent No. 1,835,420.

The silica sols employed herein are composed of colloidal particles of $SiO_2$ having a size ranging downwardly from about 600 A units. By the process disclosed in the Marshall Patent No. 2,285,449, referred to above, the colloidal particles are generally needle-like in structure, the diameter thereof being in the neighborhood of 35 A. Larger colloidal particles may be formed from the needle-like particles by a lengthening of the chain of molecules comprising the particle. The larger particles, in the 600 A range are probably composed of closely knit bundles of the fibrous or needle-like variety.

The silica sol may be incorporated into the resin in various ways. I may add the sol to the monomeric vinyl aromatic compound or a mixture of the same with a monomer which is copolymerizable therewith, remove any alcohol or water by distillation, thereby forming an organosol and then polymerize the resulting organosol by any of the known polymerizing procedures, i. e., by polymerization in mass, in emulsion, in suspension, or in solution. Polymerization may be carried out with or without the use of polymerization catalysts. Or, if desired, the mixture of monomer and aquasol or alcohol sol may be polymerized directly, forming a polymerized silica organosol, in which case the water or alcohol is removed from the polymerization product during or subsequent to the polymerizing step. The silica sol may also be added to the polymeric vinyl aromatic compound or to a vinyl aromatic interpolymer. This may be effected by dissolving the polymeric material, adding the sol to the resulting solution and then removing the alcohol and, if desired, the solvent, by distillation. When employing this procedure, for many purposes removal of the solvent and the sol medium is unnecessary. For example, solutions which may be cast into films or used as coatings are obtained by dissolving a polymeric vinyl compound such as polystyrene in a solvent, for example, dioxane, and adding an isopropanol silica sol to the solution or adding aquasol to an emulsion of the polymer or copolymer.

When operating by any of the procedures described above, employing from, say, 2% to 70% by weight of colloidal silica (calculated as $SiO_2$) of the total weight of the vinyl compound and silica, there are obtained homogeneous silica-containing materials which may be cast or molded to give clear, colorless objects or films of very good mechanical properties and high heat resistance.

Especially interesting results are obtained by combing plasticized vinyl aromatic resins with the silica sols. When polystyrene is plasticized with such plasticizers as dibutyl phthalate, tricresyl phosphate, etc., there are obtained films which, though flexible are undesirable for certain purposes because of their excessive tackiness. While this property is of value when the material is to be used as an adhesive, when the plasticized polystyrene is to be used in coatings or in the manufacture of films, the extreme tackiness is a distinct drawback. I have found, however that when a silica sol, for example, a silica aquasol is added to an aqueous emulsion of polystyrene containing one or more of the known plasticizers, films cast from the emulsion are clear, non-tacky, tough and elastic. Attempts to incorporate ordinary silica with polystyrene by dispersing the silica in a ball mill with water and emulsifier and adding this to the emulsion of polystyrene results in the formation of opaque, brittle resins. Evidently, the colloidal structure of the silica sol is the instrumental factor in the production of clear, flexible siliceous polystyrene, for I have found that when even large amounts of the silica sol are added to the polystyrene emulsion, in presence or absence of a plasticizing agent, the resulting films are substantially as clear as those prepared from polystyrene in absence of silica.

There is a gradual gradation of properties in the polystyrene films, which depends upon the quantity of silica sol employed. I have found the optimum quantity of the sol, calculated as $SiO_2$, to be from, say, 5% to 25% by weight of the combined vinyl aromatic compound and silica. When the quantity of silica exceeds, say, 25%, polystyrene films are slightly brittle, although plasticizers may be incorporated should it be desirable to overcome this property. On the other hand, films containing from, say, 6% to 12% of the silica sol are stronger, more elastic, and less tacky than plasticized or unplasticized polystyrene films formed in the absence of silica sol. The heat-resisting properties of the silica sol-containing films are thereby materially increased as will be hereinafter disclosed.

While polystyrene films containing more than 25% of colloidal silica are somewhat brittle, such films are of interest as coating materials for various purposes in the electrical arts, where they may be applied to supporting surfaces. With colloidal silica contents as high as 80% to 90% by weight, the balance being a polymerized vinyl aromatic compound such as polystyrene, the combination can be produced in the form of extremely thin continuous films.

Inclusion of the silica sols in the polymers or copolymers in amounts of, say, from 5% to 25% of colloidal silica results in the production of transparent, flexible materials which are distinguished by great heat-resistance. For example, while the A. S. T. M. heat distortion point of polystyrene is about 78° C., an unplasticized polystyrene containing about 6% by weight of silica sol has an A. S. T. M. heat distortion point above 90° C. and is unaffected when immersed in boiling water for long periods of time.

The present invention is further illustrated, but not limited, by the following examples:

*Example 1*

A mixture consisting of 100 g. of styrene, 40 g. of dibutyl phthalate, 0.02 g. of potasium persulfate, 210 g. of water and 6.2 g. of a wetting agent known to the trade as "Santomerse D" (a sodium alkyl benzene sulfonate) was emulsified by agitation for a period of one hour at a temperature of 94° C. A silica aquasol containing 11% $SiO_2$ was added to the emulsion in the proportions noted below and films were cast from the colloidal silica-styrene emulsion. In 8 separate experiments, carried out as above, 100 parts by weight of the polystyrene emulsion were used in each test with the quantity of silica aquasol (11% $SiO_2$) given below and films were cast from each of the test samples. The properties of the dried cast films are indicated below:

| Test No. | Silica Aquasol, (pts. by wt.) | Nature of Film |
| --- | --- | --- |
| 1 | 0.0 | Rough, tacky film. |
| 2 | 12.5 | Less tacky than (1); smooth. |
| 3 | 25.0 | Less tacky than (2); smooth. |
| 4 | 37.5 | Very smooth, strong film. |
| 5 | 50.0 | Same as (4) and non-tacky. |
| 6 | 75.0 | Same as (5) but stronger. |
| 7 | 100.0 | Strong, non-tacky, smooth film. |
| 8 | 200.0 | Slightly brittle, smooth film. |

From the above experiments it is evident that as the quantity of silica sol increases from 12.5% to 200% by weight of the styrene emulsion, there are obtained films which are progressively stronger and non-tacky. 100 parts of the styrene emulsion contain about 28 parts by weight of styrene. 12.5 parts by weight of the aquasol contain about 1.375 parts by weight of $SiO_2$. Hence, a noticeable improvement in the film with respect to tackiness is obtained by employing about 4.7% by weight of silica in the film. When, as in test No. 8, 22 parts of SiO₂ are used per 28 parts by weight of styrene (44% by weight of SiO₂), the film becomes brittle. Substantially the same results are obtained when tricresyl phosphate instead of dibutyl phthalate is used as plasticizer.

*Example 2*

100 parts of a 19% silica sol in isopropanol was added to 100 parts of liquid monomeric styrene and the resulting mixture was thoroughly homogenized by stirring. The isopropanol was then removed from the mixture by distillation under reduced pressure. A stable organosol was thus produced. The silica-containing monomeric styrene was then polymerized at a temperature of 100° C. for a period of 4 days. There was thus obtained a hard, transparent resinous mass having a softening point of 175° C. and a melting point of greater than 260° C., which was insoluble in dioxane, benzene, ethylene dichloride and carbon tetrachloride. It contained 16% by weight of colloidal silica. Other liquid monomeric vinyl aromatic compounds may be converted to organosols by a similar procedure.

A similarly obtained polystyrene, prepared in the absence of the silica sol has a softening point of about 115° C. and is soluble in carbon tetrachloride, benzene and dioxane. A polystyrene prepared by polymerizing styrene in admixture with a finely ground silica is likewise soluble in benzene and dioxane, the resulting solution containing the undissolved particles of the originally employed silica.

*Example 3*

A mixture consisting of 100 g. of monomeric styrene, 210 g. of water, 0.02 g. of potassium persulfate and 6.2 g. of the "Santomerse D" wetting agent, described in Example 1, was agitated for a period of one hour at a temperature of 94° C., whereby the styrene was polymerized. A silica aquasol containing 11% SiO₂ was added to the emulsion in the proportions noted below and films were cast from the various samples. In 5 experiments 100 parts by weight of the polystyrene emulsion was used in each test with the quantity of silica aquasol given below and the heat properties of films cast from each of the test samples were noted as follows:

| Test No. | Silica Aquasol (pts. by wt.) | SiO₂ Content (% by wt.) | Softening Point, °C. | Melting Point, °C. |
|---|---|---|---|---|
| 1 | 0.0 | 0.0 | 105 | 215 |
| 2 | 10.0 | 3.37 | 107 | 230 |
| 3 | 30.0 | 9.45 | 135 | 265 |
| 4 | 50.0 | 14.80 | 175 | ca. 280 |
| 5 | 100.0 | 25.80 | 185 | >260 |

The above softening points and melting points were determined on the copper Maquenne bar. 100 parts by weight of the emulsion employed in this example contain 31.6% by weight of polystyrene. 10 parts by weight of the silica sol contain 1.1 part by weight of silica. Hence, the use of even as little as 3.37% by weight of SiO₂ based on the total weight of the polystyrene and silica has a noticeable effect on the softening point and the melting point of the resulting films. Portions from each of test Nos. 3, 4 and 5 were dried by evaporating off the water and the resulting powdery materials were compression molded to give hard, substantially transparent, smooth objects which were unaffected by immersion in boiling water for 10 minutes, whereas No. 1, containing no silica, was badly distorted under these conditions. A portion of test No. 4 was dissolved in benzene and precipitated in alcohol and found to yield a high melting product. This shows that the silica was not removed from the polystyrene by solution and that, evidently, the silica formed with the polystyrene a permanently homogeneous styrene-silica dispersion which was benzene-soluble. No insoluble portions of silica could be observed in the solution and no detectable amounts of SiO₂ in sol form remained in the alcohol. The product of test No. 5 was insoluble in all of the usually employed organic solvents.

*Example 4*

This example is substantially like Example 3, except that the emulsion to which the aquasol was added contained only 30%, instead of 31.6%, by weight of polystyrene. Addition of the 11% aquasol to the polystyrene emulsion was made in the proportions indicated below and heat properties of films cast from the resulting mixtures were determined to be as follows:

| Test No. | 30% Polystyrene Emulsion | 11% Silica Aquasol | Silica Content | Softening Point | Melting Point |
|---|---|---|---|---|---|
|  | Grams | Grams | Per cent by wt. | °C. | °C. |
| 1 | 100 | 0.0 | 0.0 | 105 | 215 |
| 2 | 90 | 10.0 | 3.9 | 122 | 210 |
| 3 | 75 | 25.0 | 10.8 | 132 | 270 |
| 4 | 50 | 50.0 | 26.8 | 170 | >270 |
| 5 | 25 | 75.0 | 52.4 | 280 | >280 |

Films from tests 2, 3 and 4 were substantially transparent, smooth and flexible. The films from test 5, in which the SiO₂ content is over 50% were somewhat brittle, but smooth and continuous.

*Example 5*

Various proportions of a dioxane-propanol silica sol were added to a 10% solution of a polystyrene (average molecular weight 60,000) in dioxane. Clear films were cast and the thermal data determined on the Maquenne bar. The following results were obtained, the quantities given below denoting the actual weight of polystyrene and silica present in the solutions from which the films were cast:

| Test No. | Styrene, g. | SiO₂, g. | Softening Point, °C. | Melting Point, °C. |
|---|---|---|---|---|
| 1 | 100 | 0.0 | 80 | 198 |
| 2 | 60 | 40.0 | 110 | 260 |
| 3 | 35 | 65.0 | 145 | >260 |

Portions of test solutions Nos. 2 and 3 were precipitated in alcohol and molded test specimens prepared from the resulting dried, powdery precipitates had similarly high thermal properties. Both the films and the molded objects were smooth and transparent.

*Example 6*

This example shows the effect of colloidal silica on a styrene-acrylonitrile interpolymer. 70 parts by weight of styrene, 30 parts by weight of acrylonitrile and portions of isopropanol silica sols containing the quantities of SiO₂ noted below were mixed together and the isopropanol was then removed from the mixture by distillation under partial vacuum, whereby the colloidal silica was transferred to the mixture of monomers. The resulting mixtures of styrene, acrylonitrile and colloidal silica were then polymerized at a temperature of 70° C. for 3 days and then at a temperature of 100° C. for 3 days. Molded test specimens of the resulting copolymers were substantially clear and transparent and were found to possess the mechanical properties noted below:

| Test No. | SiO₂, g. | Tensile Strength, p. s. i. | Flexural Strength, p. s. i. | Impact Strength, in./notch foot pounds |
|---|---|---|---|---|
| 1 | 0.0 | 5,200 | 8,900 | 0.15 |
| 2 | 2.0 | 6,000 | 10,700 | 0.38 |
| 3 | 9.5 | 4,800 | 9,525 | 0.35 |

The above evaluations for tensile strength were made on a Scott J-2 tester employing a cross-head speed of 1" per minute and using as test pieces compression molded dumb-bells having a 1.5" straight section in the center, the cross section of this straight portion being 0.2" x 0.5". The above evaluation for flexural strength was made on a Scott J-2 tester modified for flexural strength, using compression molded strips 0.1" x 0.5" x 2.0", a cross-head speed of 1" per minute, and a span:thickness ratio of 8:1. The above evaluations for impact strength were determined on a standard Bell Telephone model, Izod impact tester using compression molded test strips, 0.1" x 0.5" x 2.0", which were notched and tested in the manner described in the American Society for Testing Materials specification D256-43T.

The inclusion of the silica sol in the styrene-acrylonitrile copolymer is thus seen to materially increase the impact strength of the resulting product. The silica-containing copolymers also have improved heat-resisting properties. The proportions of acrylonitrile in the acrylonitrile-styrene mixture may be varied over wide limits.

The inclusion of silica sol in other copolymers of styrene also does not affect the clarity of the same and is instrumental in improving the mechanical properties and heat-resistance thereof. Instead of styrene-acrylonitrile copolymers there may be employed with the silica sol such copolymers of styrene as those formed by interpolymerization of a mixture of styrene with such copolymerizable monomers as acrylic acid or methacrylic acid and their derivatives, for example, methyl or ethyl acrylate or methacrylate, acrylonitrile or methacrylonitrile; unsaturated ketones such as methyl vinyl ketone or methyl isopropenyl ketone; compounds containing at least two conjugated or non-conjugated olefinic double bonds such as butadiene, isoprene, divinylbenzene or diallyl succinate; alpha, beta-unsaturated olefinic acids and their derivatives such as maleic anhydride, maleic acid or fumaric acid esters such as diethyl maleate or dimethyl fumarate, maleonitrile or fumaronitrile, etc. Valuable copolymerizing components which may be employed with styrene are also the nuclearly or chain-substituted derivatives of styrene such as ortho-, para-, or meta-methyl or ethyl styrene, ortho-, para-, of meta- chloro- or fluorostyrene, alpha-methylstyrene, alpha, para-dimethyl-styrene, etc. Also, instead of styrene there may be used the substituted styrenes mentioned above or vinyl derivatives of polynuclear aromatic hydrocarbons such as alpha- or beta-vinyl-naphthalene, para-vinylbiphenyl, etc., either alone with the silica sol or in the presence also of copolymerizable materials and/or plasticizers.

Because of the excellent thermal and physical properties of vinyl aromatic polymers or interpolymers containing silica sol they are valuable for the production of extruded, cast or molded parts for the following purposes:

Electrical insulation, particularly ignition and lighting fixtures for automotive and aeronautical purposes, also switches, sockets, lamp housings, commutators, telephone parts, such as hand sets and bases, flashlight cases, lamp-shades, vacuum cleaners, electrical shavers, refrigerator parts, hair dryers, rectifiers, transformers, rheostats, voltage regulators, etc., steering wheels, decorative parts, knobs and handles, radio parts such as molded cases, plugs, adapters, coil forms, co-axial cable spacers, radar insulation and domes, condenser, panel boards, high frequency lead-ins, antenna loops and bases, photographic films, chemical tank lining material, surgical instruments (which may be sterilized without distortion), etc. For certain purposes the present materials may be drawn or extruded into threads or fibers. As hereinbefore described, the present silica sol-containing vinyl aromatic polymers or copolymers are particularly valuable in the production of coating materials and cast films. Because of their ability to control the stickiness which is often developed when vinyl aromatic polymers or copolymers are incorporated with plasticizers, the silica sols are very advantageously employed with this combination. As plasticizers may be used any non-volatile material which is known to be compatible with vinyl aromatic resins and to have a plasticizing effect when incorporated therein.

A variety of methods may be utilized in applying the principle of my invention, and the products produced thereby, the invention being limited only by the appended claims.

What I claim is:

1. The process which comprises mixing a silica aquasol with an aqueous polystyrene emulsion, drying the resulting mixture and recovering a polystyrene product containing from 2% to 70% by weight of silica, the balance of said product being polystyrene, the amount of silica aquasol employed being sufficient to supply to said product the said 2% to 70% by weight of silica in said product, the silica in said product being inseparable upon solution of said product in a solvent for said polystyrene.

2. The process which comprises mixing a silica aquasol with an aqueous polystyrene emulsion, drying the resulting mixture and recovering a polystyrene product containing from 5% to 25% by weight of silica, the balance of said product being polystyrene, the amount of silica aquasol employed being sufficient to supply to said product the said 5% to 25% by weight of silica in said product, the silica in said product being inseparable upon solution of said product in a solvent for said polystyrene.

RAYMOND B. SEYMOUR.

REFERENCES CITED

The following references are of record in the file of this patent:

UNITED STATES PATENTS

| Number | Name | Date |
|---|---|---|
| 2,285,477 | White | June 9, 1942 |
| 2,333,513 | Berberich | Nov. 2, 1943 |
| 2,408,656 | Kirk | Oct. 1, 1946 |

FOREIGN PATENTS

| Number | Country | Date |
|---|---|---|
| 46,530 | Denmark | Nov. 21, 1932 |